UNITED STATES PATENT OFFICE.

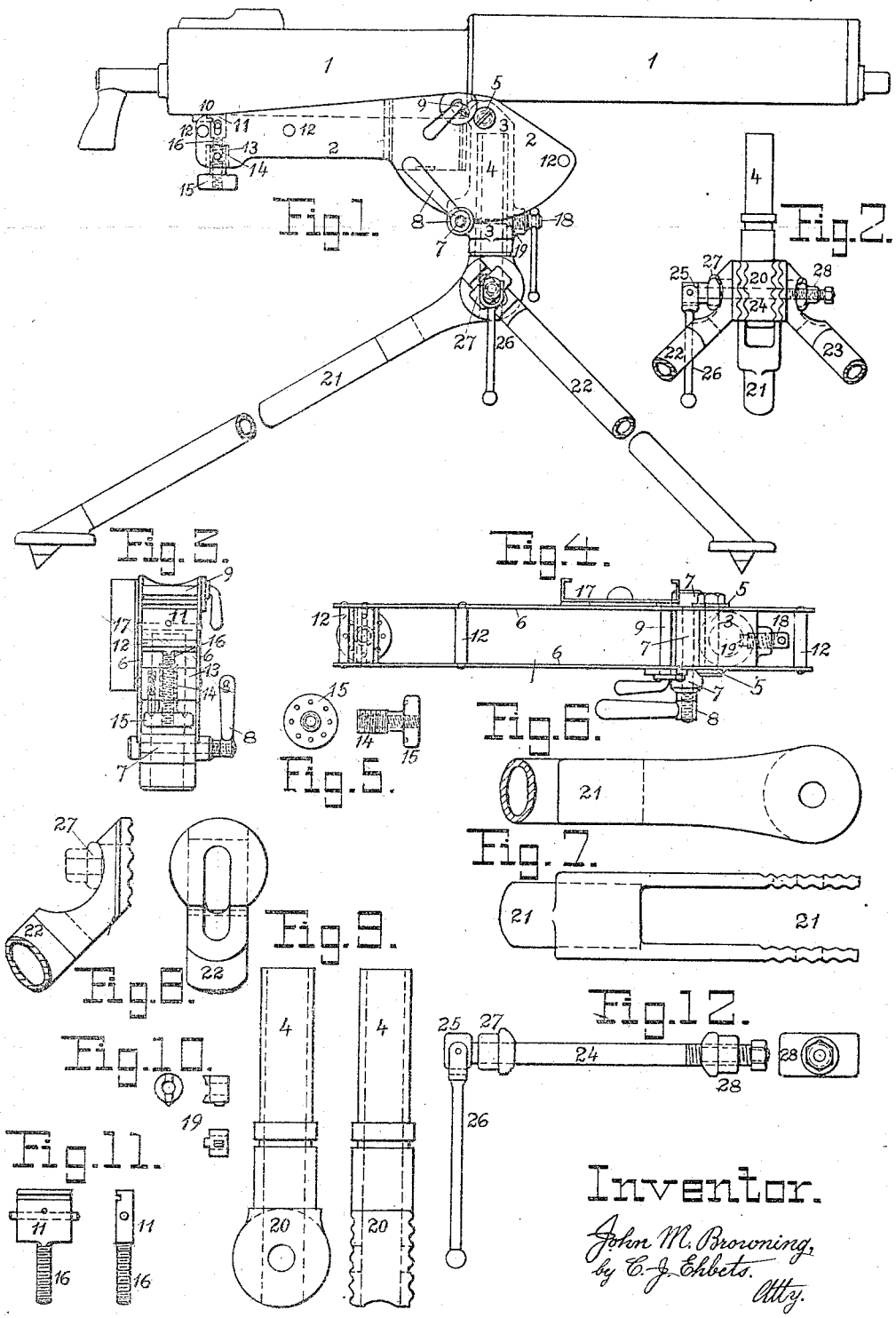

JOHN M. BROWNING, OF OGDEN, UTAH.

MOUNT FOR MACHINE-GUNS.

1,293,020.

Specification of Letters Patent.　　Patented Feb. 4, 1919.

Application filed April 26, 1916.　Serial No. 93,793.

*To all whom it may concern:*

Be it known that I, JOHN M. BROWNING, a citizen of the United States, residing in Ogden, in the county of Weber and State of Utah, have invented certain new and useful Improvements in Mounts for Machine-Guns, of which the following is a specification, reference being had to the accompanying drawings, forming a part hereof.

The invention relates generally to mounts for machine guns in which it is essential that the gun may be readily and easily turned and sighted in all directions in the horizontal plane as well as in the vertical and to any angle between these extremes; and it especially relates to mounts for automatic guns of this class.

The invention particularly relates to novel improvements in tripod-mounts for machine guns, but portions thereof may be as readily used for mounting guns of this class upon light wheeled vehicles of the kind used for the transporting of guns of this class.

The main object of the present invention is to produce an improved tripod-mount of this class specially adapted for the military service by being light but strong and absolutely reliable under all conditions; while simple in construction and not liable to get out of order, and inexpensive of manufacture.

This object is attained by generally simplifying the mount and by providing an improved construction of certain parts thereof.

In the embodiment of these improvements represented in the accompanying drawings, a machine gun of a well-known type, the rear portion of which has the form of a rectangular breech-casing and the forward portion inclosing the barrel has the form of a cylindrical water jacket, is represented as mounted upon the improved tripod-mount, but it will be understood that I do not intend to restrict the use of my mount to this particular type of machine gun, but that it may be readily adapted for other types.

In the acompanying drawings:

Figure 1, represents in a right-hand side elevation the tripod-mount with a machine gun mounted upon the same.

Fig. 2, represents a front view of the tripod-body with its pivot post, portions of the legs being omitted.

Fig. 3, represents a rear end view of the mount or swivel, with the socket for receiving the pivot post; on an enlarged scale.

Fig. 4, represents a plan of the mount or swivel seen from above; on an enlarged scale.

Fig. 5 represents a top view and a side view of the lower elevating screw and hand wheel, detached.

Figs. 6 and 7, represent respectively a side view and a top view of the forked upper portions of the rear or trail leg, detached; on a still more enlarged scale.

Fig. 8, represents a front view and a side view of the upper portion of the two forward legs, detached; on a similar scale.

Fig. 9 represents a side view and a rear view of the tripod-body, detached.

Fig. 10, represents the binding shoe, detached, in front view, top view and side view.

Fig. 11, represents a rear view and a side view of the combined upper elevating screw and gun clamp, detached.

Fig. 12, represents a rear view and an end view of the clamp bolt, detached, with the washer, nut and check nut and the pivoted wrench.

Similar figures refer to similar parts throughout the several views.

In tripod-mounts as heretofore generally constructed, it has been customary to attach the gun firmly to an upper mount, and support this mount pivotally on a swivel provided with a platform or turn-table from which a pivot post projects downward. The socket for this pivot post was provided by the body of the tripod. To the outside of such socket, beneath the platform, the legs of the tripod were usually attached so as to extend at equal angles radially outward and downward; each of the legs being attached below the swivel-platform by its separate pivot bolt.

With such construction it is necessary, when the legs are to be adjusted, to loosen each leg separately by unscrewing the nut on its pivot bolt, to adjust it and fasten it in the desired position. Moreover, the fact that the swivel-platform extended above the legs to a considerable distance outward from the center necessarily limited the movements of the legs; and each leg could only be adjusted outward or inward within the plane at right angles to its pivot bolt.

My improved tripod-mount consists of two main parts, the upper mount or swivel for receiving and holding firmly the gun, and the lower part or tripod proper, neither of these parts having a projecting-platform or turn-table; moreover, the three legs of the tripod are attached and adjusted by one single pivot bolt which also serves for fixing or releasing each and all of the three legs by one movement or at will adjusting them in the desired position by the movement of a single bolt.

In Fig. 1, the gun 1 is outlined as mounted upon the swivel 2, gun and swivel being supported by the tripod. The swivel 2 consists of the swivel-body 3 forming a socket fitted over the pivot post 4 and adapted to turn thereon with the gun 1 in the horizontal plane, or to be firmly fixed upon the pivot post 4.

On each side the swivel-body 3 is flattened and two cheek pieces 6, 6, in form of thin plates, are fitted to the swivel-body 3 to extend rearward therefrom for holding and supporting the lower sides and the rear end of the gun, while a pivot bolt 5 is fitted through the cheek pieces 6, 6 and the swivel-body 3 so that the cheek pieces 6, 6 with the gun can swing vertically upon the pivot bolt 5 independently of the swivel-body 3, which however, serves to hold the two cheek pices 6, 6 the proper distance apart. For further binding together the two cheek pieces 6, 6 at the proper distance apart for receiving the lower portion of the rectangular breech-casing, three stay-bolts 12, 12, 12 are firmly riveted between the cheek pieces 6, 6, one stay-bolt near the rear end and one near the front end thereof and the third between the rear one and the pivot bolt 5, these stay-bolts being nearer to the upper edge of the cheek pieces 6, 6 than to the downwardly projecting forward portion of the same.

The depending lower edges of the forward portion of the cheek pieces 6, 6 have the form of a segment of a circle, concentric with the pivot bolt 5; and the swivel-body 3 on its lower rear face has a transverse boss through which a binding bolt 7 is so fitted that a portion of its head projects over the segmental lower edge of the left cheek piece 6, while on the right side a washer on the bolt 7 similarly projects over the outside of the right cheek piece 6, so that when the binding nut 8 on the right end of the bolt 7 is screwed inward by means of its handle, the cheek pieces 6, 6 are both forced inward firmly against the sides of the swivel-body 3 and thereby the cheek pieces 6, 6 are positively prevented from moving on their pivot bolt 5. See Figs. 1 and 3.

Slightly in rear of the top of the swivel-body 3 and of the pivot bolt 5 a hole is bored transversely through the cheek pieces 6, 6 and a corresponding hole is provided through the lower portion of the gun casing for receiving the transverse gun-pin 9 provided with a handle on its right end.

Near its rear end on its under side the gun casing carries a rectangular rib or projection 10, from the front side of which a lip extends forwardly. Between the rear ends of the cheek pieces 6, 6 a block 11 is fitted to slide vertically, being held in position by a transverse pin and a vertical slot in the cheek pieces 6, 6 which guide and limit the upward and downward movements of the block. This block forms the combined upper elevating screw and gun clamp. See Figs. 1 and 11. Near the upper end of its rear face this block 11 has a transverse groove or recess corresponding to the lip on the rib 10 and ready to receive the same.

In order to mount the gun upon the swivel and between the cheek pieces 6, 6 the gun is laid with the rear portion of its water jacket resting upon the swivel-body 3 and then the gun is moved forward until the lip of the projection 10 enters the recess in the block 11. This will cause the transverse hole in the gun 1 and those in the cheek pieces 6, 6 to coincide so that the gun-pin 9 may be readily inserted into them.

By this simple means the gun is firmly attached and fixed to the upper mount or swivel; the rear end of the gun being positively locked to the block 11 between the cheek pieces 6, 6.

Below the block 11 another strong block 13 having a trunnion on each side is fixed between the rear ends of the cheek pieces 6, 6. Through this block 13 a strong screw 14 having left-hand thread and carrying a small hand wheel 15 at its lower end, is fitted. Lengthwise through this screw 14 and hand wheel 15 a hole is bored and threaded to receive the threaded stem or screw 16 extending downward from the block 11, the thread of this interior screw 16 being right-handed. Thus, while the fixed block 13 forms a nut for the larger screw 14 this screw 14 itself forms the nut for the stem 16, and by turning the screw 14 upward in the fixed block 13 the screw 16 and the block 11 are also moved upward within the limits of the transverse pin and the slot in the cheek pieces 6, 6, while by turning the hand wheel in the reversed direction, the screw 14 and the hand wheel 15 are moved downward in the block 13 and the block 11 and screw 16 are also moved downward. This arrangement serves for the sighting of the gun 1 when a fine or exact aim is necessary. For rapidly elevating or depressing the muzzle of the gun 1 for any considerable amount in aiming at an object, the binding nut 8 is loosened on the bolt 7 thereby allowing gun 1 and cheek pieces 6, 6 to be raised or lowered by turning on the pivot bolt 5. When this elevation has been made to the desired extent, the binding nut 8 is tightened thus fixing the cheek pieces 6, 6 to the swivel-body 3. If now a more exact finer aim is desired the hand wheel 15 is turned when it will raise or lower the block 11 and the rear end of the gun 1 to a limited extent, thereby enabling a fine sight or aim at a special object to be attained.

The block 11 and its limited vertical movement by means of the hand wheel 15 and screws 14 and 16 thus take the place of the usual large and more complicated elevating gear. The block 11 during its vertical movement never loses its firm hold upon the rear end of the gun by means of the interlocking of the block 11 with the lip of the rib under the gun.

In order to prevent the adjustment by the hand wheel 15 and the screws from being disturbed during firing, as by the vibrations caused by a series of shots of the gun following each other in rapid succession, a number of small circular depressions are made in the upper surface of the hand wheel 15, and in the block 13, a small vertical piston and a spring are provided, the pointed lower end of the piston bearing on the top surface of the hand wheel 15 and adapted to enter into one of the series of depressions; in this manner the spring-actuated piston operates as a friction brake and yieldingly holds the hand wheel 15 in any position to which it may be turned. See Figs. 3, 4 and 5. The left-hand cheek piece 6 carries upon its outside the usual bracket 17 for receiving and holding a feed box containing a feed belt with cartridges in the pockets thereof, this being a well-known arrangement and not forming a part of my improvement does not require any further description herein.

The swivel-body 3 is provided on its forward face with a boss in which the binding screw 18 is fitted transversely to the axis of the socket of the swivel-body. At its outer end the binding screw 18 has a handle and on its inner end carries a small binding shoe 19, see Figs. 1 and 4; this shoe is shown detached in Fig. 10 in three views. This shoe 19 has a projecting rib fitting into a corresponding recess or groove on the outside of the pivot post 4 of the tripod-body. This binding screw 18 with its handle and shoe 19 serves at will to fasten the upper mount or swivel against turning upon the pivot post 4 and the projecting rib of the shoe 19 with the corresponding grooves in the post 4 locks the swivel-body 3 and through it the swivel and the gun upon the tripod-body.

Having thus described the upper mount, it remains to explain the lower parts or tripod.

As shown in Figs. 1 and 2, the tripod consists of the central tripod-body, the three legs, and the means for attaching the three legs adjustably to the tripod-body. The upper portion of the tripod-body forms the pivot post 4 and to it the lower part of the body is joined in the form of a strong circular hub, 20. At the junction between this hub 20 and the post 4 is a circular shoulder or seat upon which the lower end of the socket of the swivel-body 3 rests when the swivel is mounted upon the post 4. Thus this shoulder or seat takes the place of the large projecting circular-platform of tripods as made heretofore.

The longer rear or trail leg 21 carries at its upper end a fork, see Figs. 2, 6 and 7, the interior sides of the two branches of which are fitted to the sides of the hub 20 and a central transverse bolt through the branches of the fork and through the hub 20 pivotally attach the rear leg to the body of the tripod in such a way that the leg may be readily adjusted upon the hub 20.

Each of the two shorter forward legs 22, 23 of the tripod carries at its upper end a circular hub with a central slot, by means of which the two legs may be attached to the outer sides of the branches of the fork of the trail leg 21 and through them to the hub 20 of the tripod body. On the outer face of the circular hub of each leg 22, 23 a strong rib is formed parallel to the axis of the leg by which the thickness of the hub is increased in size to equal the diameter of the leg, and the width of said rib also coincides with the outer surface of the legs. See Figs. 1, 2 and 8. In this rib on the outside of the upper part of each leg a nearly semi-circular recess is cut, clearly shown in Fig. 8, where also the central slot through the hub and through the rib of each leg is clearly shown. The same central bolt which passes through the hub 20 of the tripod-body and through both sides of the fork of leg 21 also passes through the hub and through the rib outside of the hub of each of the legs 22, 23. On its right side the leg bolt 24 carries a head 25 to which the upper forked end of a wrench 26 is pivotally attached by a transverse pin; and under the head 25 and between it and the concave recess in the rib on the outside of the hub of the leg 22 a washer 27 is loosely fitted upon the leg bolt 24; this washer 27 is of rectangular shape but much wider in the direction transverse to the axis of the leg than in the direction of the axis of the leg. Both inner corners on the long sides of this washer are rounded off so that the washer will adjust itself to the semi-circular recess in the rib on the outside of the leg hub in whatever position the leg may adopt. The longer transverse sides of this rectangular washer insure that the same cannot turn on its center in the recess as its edges will, in fitting themselves into the semi-circular recess, retain the washer in a position where its longer sides are at right angle to the axis of the leg. In the front view represented in Fig. 8 the washer 27 is indicated by dotted lines showing clearly the manner in which it adjusts itself to the semi-circular recess. On the other end of the leg bolt 24 a nut 28 is fitted, the outer shape of which is similar to that of the washer under the head on the other end of the bolt 24, but being a nut it has an interior thread to screw on the leg bolt. The rounded corners of the inner face of the nut 28 insure that the nut also will be kept from turning with the bolt 24, after it adjusts itself in the concave semi-circular recess in the rib on the hub of the leg 23 just like the washer 27 adjusts itself on the other end in the rib on the leg 22. The leg bolt 24 extends considerably beyond the outer face of the nut 28 and a small check nut is fastened upon the end of the bolt 24 to prevent the nut or washer from escaping from the bolt 24 or the bolt from its seat in the tripod-body and legs.

Each of the three legs 21, 22, 23 carries at its lower end the usual foot plate from which a sharp point or spike extends downward to insure the grasp of the legs upon the ground or base.

By the construction as described, the three legs of the tripod may be readily adjusted after loosening them by unscrewing the bolt 24. The legs may be brought nearer together thereby raising the tripod-body, swivel and gun to the maximum height above the ground; or the legs may be spread farther apart so as to lower the gun and its mount. The three legs may be allowed to spread until they lie upon the ground and until the hub of the tripod-body 20 also touches the ground, thereby lowering the gun and its mount to its extreme depressed position. Besides these adjustments of the legs for varying the elevation of the gun above the ground, the two front legs may also be adjusted, after loosening the bolt 24, independently of each other as the uneven condition of the ground may require; in a position on the side of a hill or incline, for example, one leg may be adjusted at an angle more steep than the other legs thereby having the effect of shortening or lengthening the legs respectively.

In addition to enabling the legs to be at will adjusted, the construction as described also permits the tripod-body to be at will adjusted while the legs remain unmoved in their position. After loosening the bolt 24, the gun, together with the upper mount and the tripod-body may be turned on the bolt 24 as a pivot, thereby at will depressing the muzzle of the gun until the axis of the gun is in the vertical plane; or the muzzle of the gun may be elevated until it is pointed upward in the vertical plane. The only further condition for this last adjustment being that the gun and swivel are turned to one side sufficiently that the depressed rear end of the gun will pass to one side of the rear or trail leg. By turning the bolt 24 by means of its handle 26 the gun may be fixed in either of the extreme positions described or at any intermediate angle of elevation or depression.

To increase the friction between the tripod-body and the fork of the trail leg and between the outside of the fork and the two shorter legs, the inner face of the hubs of the shorter legs and the outer and inner sides of the fork branches, as well as the sides of the tripod-body 20 have been provided with radial serrations. These are indicated in Figs. 2, 7, 8 and 9 in the edge views of the respective parts, but have not been shown in the side views as they are of rounded shape and, therefore, do not show in sharp lines. Moreover, such serrations are a well-known construction for increasing the frictional hold and, therefore, do not require further representation.

In addition to the various positions to which the construction adapts the legs to be adjusted, as described, the forward legs may be turned rearward until they are in the same plane with the rear or trail leg and the legs may be lowered together until all three of them lie extended in rear of the hub 20 on the ground and until the hub also touches the ground or base, the two shorter legs diverging outward and rearward from the longer central leg, in which position the three legs may be fastened. This last position of the legs will enable the gun to be fired from an elevated-platform such as the top of a house, and by placing some weights across the three legs, or seating some persons upon them to counterbalance the weight of the gun and the upper mount, the gun may be moved so as to project beyond the edge of the house-top and the muzzle of the gun may be depressed, thereby enabling the gun to be fired at will at any angle downward to cover streets or other approaches below.

The three legs may be turned so as to lie side by side in one plane, then the slot in the hubs of the short legs allows these to be folded up for packing and transport in the smallest possible space. By loosening and unscrewing the bolt 24 to a considerable extent, the feet of the shorter legs may be moved inward until they are close to the longer central leg, and so that all three legs lie parallel to each other in the same horizontal plane. The pivot post 4 of the tripod-body may then be turned rearward until it also extends rearward from the hub but above the legs.

The absence of a more or less projecting platform between the upper mount or swivel and the top of the tripod, as heretofore explained, simplifies the construction, and this improvement serves another important object.

The automatic firing of a large number of shots in rapid succession in a machine gun requires that the empty cartridge cases may be freely ejected without meeting with the least obstruction. In some guns of this type the ejection of the cases if effected laterally through an opening provided for this purpose in the side of the breech-casing, in others the cases are ejected downwardly through an opening in the bottom of the breech-casing; this downward ejection being the preferable one, as the downwardly directed stream of violently expelled cartridge cases during rapid firing, is much less liable to cause trouble than if the cases are expelled laterally.

Figs. 1 and 4 of the drawings clearly show that with the present mount the downward ejection is perfectly unobstructed, as the two cheek pieces of the swivel 2 do not project under the forward portion of the bottom of the breech-casing in rear of the gun-pin 9 where the ejection opening must be located, the smooth inner faces of the cheek pieces, on the contrary, form a guide for the ejected cases.

The upright swivel-body 3 and the tripod-body 20 being forward of the breech-casing and having no parts projecting into the path of the ejected cases cannot interfere with their descent to the ground beneath the gun and mount.

It will be evident that various changes in form and arrangement of the parts may be made without departing from the spirit of the invention.

What I claim and desire to secure by Letters Patent, is:

1. A tripod composed of the upright pivot-post fitted to enter into and to support the socket of a gun-swivel, said pivot-post extending downward in form of a hub, and the three legs adjustably attached to said hub by a single transverse bolt, the axis of said bolt located in a plane through the axis of the pivot-post.

2. In a mount for machine guns, the combination of a swivel fitted to receive and to carry the gun, and having a central socket, with the tripod composed of the pivot-post for entering said socket and a hub, and three legs adjustably attached to said hub by a single transverse bolt, the axis of said bolt lying in a plane through the axis of said pivot-post.

3. A tripod composed of an upright pivot-post fitted to enter into and to support the socket of a gun-swivel, said pivot-post carrying at its lower end a hub having a central hole and on two sides a circular face, a leg provided with a forked upper end clasping the faces of said hub, and having a hole through the branches of said fork corresponding with the hole in said hub, and two legs each provided at its upper end with a boss having a circular face and a longitudinal slot, and a single transverse bolt in the plane of the axis of said pivot-post fitted through the three legs and the central hub for adjustably attaching said legs to the hub of the pivot-post.

4. A tripod composed of an upright pivot-post fitted to enter into and to support the socket of a gun-swivel, said pivot-post carrying at its lower end a hub having a central hole and on two sides a serrated circular face, a leg provided with a forked upper end clasping the faces of said hub, and having a hole through the branches of said fork corresponding with the hole in said hub, and two legs each provided at its upper end with a boss having a circular face, and having on the outer side of said boss a longitudinal rib, and a partly circular transverse recess in said rib, a central longitudinal slot through said boss and said rib, and a single transverse bolt in the plane of the axis of said pivot-post fitted through the three legs and the central hub, and having a washer and a nut, both of rectangular form, adjusted transversely in said recess, substantially as and for the purpose described.

5. In a mount for machine guns, the combination of a swivel-body having a central socket, and two cheek pieces pivotally attached to the sides of said swivel-body and extending rearward therefrom, to receive and to carry the gun, a gun-pin fitted through said cheek pieces and the gun and provided with a handle, a block seated for a limited vertical movement between the rear ends of said cheek pieces, the rear of said block having a transverse recess to interlock with a transverse rib on said gun, whereby said gun is rigidly attached to said block, with means for transmitting vertical movement to said block and to the gun, substantially as and for the purpose described.

6. In a mount for machine guns, the combination of a swivel-body having a central socket, two cheek pieces pivotally attached to the sides of said swivel-body and extending rearward therefrom to receive and to carry the gun, a gun-pin fitted through said cheek pieces and the gun and provided with a handle, a block seated for a limited vertical movement between the rear ends of said cheek pieces, the rear of said block having a transverse recess to interlock with a transverse rib on said gun, whereby said gun is rigidly attached to said block, a vertical threaded extension depending from said block and a second block fixed between said cheek pieces and threaded to receive a screw carrying a hand wheel, said screw being internally threaded to receive said extension from the vertically movable block, whereby the turning of said hand wheel will cause a limited vertical movement of said first block and gun, substantially as and for the purpose described.

7. In a mount for machine guns, the combination of a swivel-body having a central socket, and two cheek pieces pivotally attached to the sides of said swivel-body and extending rearward therefrom to receive and to carry to the gun, a gun-pin fitted through said cheek pieces and the gun and provided with a handle, mechanism between the rear portion of said cheek pieces for interlocking said gun and said cheek pieces, with a downward extension from the forward portion of said cheek pieces forming a segment of a circle concentric to the pivot connecting said swivel-body and said cheek pieces, and a binding bolt and nut carried by said swivel-body for at will rigidly attaching said cheek pieces to said swivel-body or releasing said cheek pieces from said swivel-body, substantially as and for the purpose described.

8. A tripod composed of the upright pivot-post fitted to enter into and to support the socket of a gun-swivel, said pivot-post extending downward in form of a hub, and the three legs adjustably attached to said hub by a single transverse bolt.

9. In a mount for machine guns, the combination of a swivel fitted to receive and to carry the gun, and having a central socket, with the tripod composed of the pivot-post for entering said socket and a hub, and three legs adjustably attached to said hub by a single transverse bolt.

10. A tripod composed of an upright pivot-post fitted to enter into and to support the socket of a gun-swivel, said pivot-post carrying at its lower end a hub having a central hole and on two sides a serrated circular face, a leg provided with a forked upper end clasping the faces of said hub, and having a hole through the branches of said fork corresponding with the hole in said hub, and two legs each provided at its upper end with a boss having a circular face and a longitudinal slot, and means for adjustably attaching said legs to the hub of the pivot-post.

11. A tripod composed of an upright pivot-post fitted to enter into and to support the socket of the gun-swivel, said pivot-post carrying at its lower end a hub having a central hole and on two sides a serrated circular face, a leg provided with a forked upper end clasping the faces of said hub, and having a hole through the branches of said fork corresponding with a hole in said hub, and two legs each provided at its upper end with a boss having a circular face, and having on the outer side of said boss a longitudinal rib, and a partly circular transverse recess in said rib, a central longitudinal slot through said boss and said rib, and means for adjustably attaching said legs to the hub of the pivot-post including a washer and a nut, both of rectangular oblong form, for adjustment transversely in said recess, substantially as and for the purpose described.

12. In a mount for machine guns, the combination of a swivel-body having a central socket, and two cheek pieces pivotally attached to the side of said swivel-body and extending rearward therefrom, to receive and to carry the gun, a gun-pin fitted through said cheek pieces and the gun, a block seated between the rear ends of said cheek pieces, the rear of said block having a transverse recess to interlock with a transverse rib on said gun, whereby said gun is rigidly attached to said block, substantially as and for the purpose described.

This specification signed and witnessed this twentieth day of April, A. D. 1916.

JOHN M. BROWNING.

In the presence of—
ARTHUR L. ULRICH,
C. J. EHBETS.